United States Patent
Gunsaulus et al.

(10) Patent No.: US 6,459,173 B1
(45) Date of Patent: Oct. 1, 2002

(54) SELF-PROGRAMMABLE BATTERY LOAD/BIAS FOR MEMORY EXPANSION MODULE

(75) Inventors: Richard Scott Gunsaulus, Highland Heights; William E. Floro, Willoughby, both of OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 105 days.

(21) Appl. No.: 09/699,802

(22) Filed: Oct. 30, 2000

(51) Int. Cl.$^7$ ................................................ H02D 7/00
(52) U.S. Cl. .............................. 307/66; 307/64; 307/23; 307/18; 307/85
(58) Field of Search .............................. 307/66, 64, 85, 307/23, 18

(56) References Cited

U.S. PATENT DOCUMENTS

| | | | |
|---|---|---|---|
| 5,616,968 A | * 4/1997 | Fujii et al. | 307/66 |
| 5,744,932 A | 4/1998 | Kissel | |
| 5,886,503 A | 3/1999 | McAndrews et al. | |
| 5,929,601 A | 7/1999 | Kaib et al. | |
| 6,031,354 A | * 2/2000 | Wiley et al. | 320/116 |
| 6,169,387 B1 | 1/2001 | Kaib | |
| 2001/0050561 A1 | * 12/2001 | Rundkvist | 324/678 |

* cited by examiner

Primary Examiner—Brian Sircus
Assistant Examiner—Robert L Deberadinis
(74) Attorney, Agent, or Firm—Himanshu S. Amin; Alexander M. Gerasimow; R. Scott Speroff (57) ABSTRACT

A system and method is provided for selecting a test load and/or bias resistor utilized in an expandable load system employing a backup power source. The test load and/or bias resistor is selected based on the actual load present in the expandable system. The backup power source is periodically tested during normal operation of the expandable load system utilizing the test load. A test load is provided that is sized for the actual load of a local load under worse case conditions. If an expansion load is connected to the local load the test load is adjusted, so that the test load is based on the actual load of the local load and the expansion load. Additionally, a bias resistance can be provided for driving a switch that allows power to be provided to the local load during power loss mode. If an expansion load is connected to the local load, the bias resistance is adjusted to correspond to a bias resistance necessary to provide the current for the actual load of the local load and the expansion load.

28 Claims, 6 Drawing Sheets

SELF-PROGRAMMABLE BATTERY LOAD/BIAS FOR MEMORY EXPANSION MODULE

TECHNICAL FIELD

The present invention generally relates to battery backup systems and in particular to a system and method of selecting a bias resistor and a test load for battery backup systems employed in modules that have load expansion capabilities. The present invention has particular applicability to industrial control modules utilizing volatile memory.

BACKGROUND OF THE INVENTION

Backup power sources are utilized in many electronic devices for providing alternate power in the event that the main power to the electronic device is temporarily or permanently removed, such as in the case of a periodic shutdown or a power loss. Typically, these backup power sources (e.g., batteries or the like) are periodically assessed to determine whether or not the backup power source has enough charge to provide power for the load it is designed to operate. Testing a backup power source can be accomplished by temporarily connecting the backup power source to a resistor sized to correspond to a worse case current draw that the actual load can experience. In addition, switches are used, for example such as a PNP transistor switch, to connect the backup power source voltage to the load being driven. The PNP transistor switch includes a base lead bias resistor that is also sized to correspond to the actual load being driven at the collector lead for a worse case condition.

A problem evolves in the event that the module employed that utilizes the backup power source is expandable to drive additional loads. In these situations, the backup source test load and the bias resistor are set for currents that ensure the ability to drive the maximum load that may be provided utilizing a worse case expansion with all modules operating in a worse case condition. However, in many cases a user may utilize a much smaller expansion load or no expansion load at all. The result is that the backup power source life is reduced as a result of a larger than necessary bias current and a larger than necessary test load current. Furthermore, the service life of the backup power source is reduced due to the fact that the backup power source voltage is reduced more at the higher test load, causing it to reach a service warning level faster than it would at a lower test load current.

For example, if the backup power source is a primary lithium battery cell and the load is a volatile memory, the PNP transistor switch acts as a reverse current blocker/limiter to prevent the primary lithium cell from being charged. Traditionally, both the backup power test load and PNP bias current would be set to accommodate the maximum amount of memory to be supported. However most memory expansion modules have a wide range of memory options possible, for example, 2 MB may use 2 mA of battery current, 4 MB may use 4 mA of battery current and 8 MB may use 8 ma of battery current. If a bias resistor and a test load resistor are set for 8ma for a 2MB memory, then battery service life for the 2 MB memory option suffers by 8 to 28%, depending on temperature. This causes many applications with the lower memory options to lose significantly more battery service life than necessary to enable a small percentage of applications to install a 8 MB option module.

Accordingly there is an unmet need in the art to provide expandable systems employing backup power sources with appropriate test loads for any given configuration. Additionally, there is an unmet need in the art to provide expandable systems employing backup power sources utilizing bias resistors to drive power switches with appropriate bias resistances for any given configuration.

SUMMARY OF THE INVENTION

The present invention provides for a system and method for selecting a test load and/or bias resistor utilized in an expandable load system employing a backup power source. The test load and/or bias resistor is selected based on the actual load present in the expandable system. For example, the test load can be selected (e.g. sized) to have a load substantially equivalent to an actual load of the system operating in a worse case condition. A service warning signal can then be initiated if the backup power source voltage falls below a predetermined voltage level during a test cycle. Alternatively, the test load can be sized to draw current at a proportionate level of the actual load and the predetermined voltage level increased. Regardless of the selected test load level and corresponding predetermined voltage level, the test load is selected to be sized based on the actual load of the system, such that the test load provides adequate determination of the backup power source to provide current drawn by the actual load in a worse case condition.

During normal operation, the backup power source is periodically tested utilizing the test load and comparing voltage of the backup power source under test load to a voltage warning signal level. If an expansion load is not connected in the system, a test load is provided that is sized based on the actual load of a local load under worse case conditions. If an expansion load is connected to the local load the test load is adjusted, so that the test load remains based on the actual load, which now becomes a combination of the local load and the expansion load. The adjustment of the test load can be provided by utilizing hardware (e.g., placing a resistor in parallel with test load) or via hardware (e.g., reading an ID of the expansion load and setting the test load accordingly).

Additionally, a bias resistance can be provided for driving a switch (e.g. a PNP transistor) that allows power to be provided to an actual load during power loss mode by the backup power source. If an expansion load is not connected in the system, the bias resistance is selected based on the collector current necessary to provide power to a local load under a worse case condition. If an expansion load is connected to the local load, the bias resistance is adjusted to correspond to a bias resistance necessary to provide the current for the actual load of the local load and the expansion load under a worse case condition. The adjustment of the bias resistance can be provided by utilizing hardware (e.g., placing a resistor in parallel with a local bias resistor) or via software (e.g., reading an ID of the expansion load and setting the bias resistance accordingly).

In one aspect of the invention, a system and method is provided for sizing a test load and/or bias resistor utilized in a system having expandable volatile memory and employing a backup battery. The test load and/or bias resistor are sized based on the actual memory present in the expandable system. The backup battery is periodically tested during normal operation of the expandable memory system utilizing the test load. The test load is sized based on the actual load of a local memory under worse case conditions. If an expansion memory is connected to the local memory, the test load is adjusted by placing a second test load across the first test load, so that the test load remains based on the actual load, which in this case is the load of the local memory and the expansion memory. Additionally, a base lead bias resistance is provided for driving a PNP transistor that allows power to be provided to the local memory during power loss mode. The base lead bias resistance is selected based on the collector current necessary to provide power to a local memory under a worse case condition. If an expansion memory is connected to the local memory, the base lead bias resistance is adjusted to correspond to a base lead bias resistance necessary to provide the collector current for the actual load of the local memory and the expansion memory under worse case conditions.

The following description and the annexed drawings set forth in detail certain illustrative aspects of the invention. These aspects are indicative, however, of but a few of the various ways in which the principles of the invention may be employed. Other advantages and novel features of the invention will become apparent from the following detailed description of the invention when considered in conjunction with the drawings.

DETAILED DESCRIPTION OF THE INVENTION

The present invention will now be described with reference to the drawings. The present invention will be described with reference to a system and method for providing a system employing a backup power source with a test load based on the actual load present in the system. The system and method also provides the system with an optimal base lead bias resistance to drive a switch that couples the backup power source to the actual load based on the actual current necessary to power the actual load. The present system and method may be implemented utilizing hardware, software or a combination of both hardware and software.

The present system and method provide for a selection or sizing of a test load and base lead bias resistance based on the actual load present in the system at a given time. Although the present example will be illustrated with respect to selecting test loads and bias resistances for providing currents substantial equivalent to currents of the actual load during a worse case operation, it is to be appreciated that the test load can be sized to draw current at a proportionate level of the actual load and the predetermined voltage level increased as long as the adequacy of the backup power source to provide current to the actual load is assured.

Figure 1:
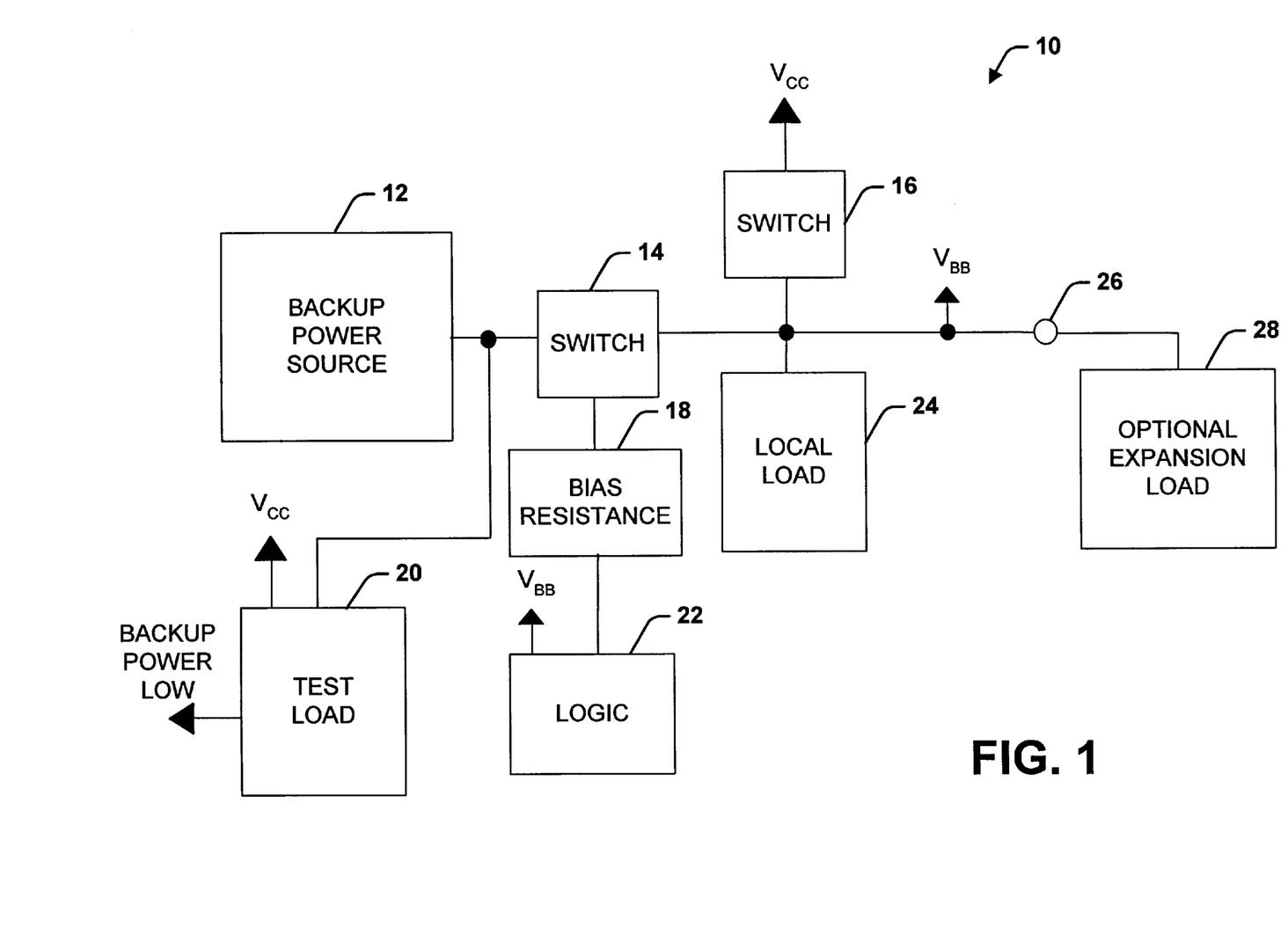
FIG. 1 is a block schematic diagram of an expandable system employing a backup power source in accordance with one aspect of the present invention.

FIG. 1 illustrates a system 10 that includes a backup power source 12 (e.g., a battery, a charged capacitor, etc.) for operating a local load 24 (e.g., local to a main or mother board) during a loss of power mode. The system 10 is expandable to provide an optional expansion load 28 (e.g., a connectable remote or daughter board) with power during the loss of power mode via a power connector 26. The backup power source 12 is coupled to a first switch component 14 and a test load circuitry component 20. The first switch component 14 is switchable between a first state when power is provided to the local load 24 and the optional expansion load 28 via normal or external power ($V_{cc}$) and a second state wherein $V_{cc}$ is not present and power is provided to the, logic component 22, the local load 24 and optional expansion load 28 via the backup power source 12. Normal power is provided, for example, by a transformer or regulator coupled to an external power source such as 110 VAC. Normal power is coupled to the local load and expansion load through a second switch component 16. The second switch component 16 is normally closed during normal operation connecting $V_{cc}$ to the local load 24 and the optional expansion load 28. During power loss mode, $V_{cc}$ is removed causing the second switch component 16 to open and the first switch component 14 to close and provide power to the local load 24 and the optional expansion load 28 from the backup power source 12.

The first switch 14 is coupled to a logic component 22 through a bias resistance component 18. The logic component 22 maintains the first switch component 14 in an open state during normal operating mode. The bias resistance component 18 provides bias current to the switch 14 to ensure that the switch 14 closes upon the system 10 entering loss of power mode, so that the backup power source 12 can provide power to the local load 24 and the optional expansion load 28. The bias resistance component 18 essentially draws current from the backup power source 12, which is considered wasted current because it is not available to operate the local load 24 and the optional expansion load 28. The logic component 22 controls operation of the first switch component 14 and is powered by the backup power source ($V_{BB}$).

During normal operation, power is provided to the local load 24 and the optional expansion load 28 through the second switch 16. Normal power is also provided to the test load component 20 and the logic component 22 during normal mode. Since power is provided to the local load 24 and the expansion load 28 during normal operation, the backup source 12 is not utilized by the local load 24 and the expansion load 28. However, periodic tests are performed on the backup power source 12 to ensure proper charge is available to drive the local load 24 and the expansion load 28 when normal power becomes unavailable (e.g., upon system shutdown). The test load component 20 includes a test load in addition to circuitry to monitor the voltage of the backup power source 12 during a test mode. The test load component 20 monitors the voltage of the backup power source 12 during the test mode where a test load is coupled to the backup power source 12. If the voltage falls below a predetermined minimum (e.g., voltage warning level), the test load component 20 sends a backup power low signal to a controller (not shown) or the like, which informs an operator that the backup power source 12 needs replacing. Conventionally, a test load is selected to provide a maximum load that would be experienced by the system 10 in a worse case condition. The worse case condition would be when the local load 24 is drawing maximum current and an optional expansion load is selected that draws the highest current amongst a plurality of selectable expansion loads, where the selected optional expansion load is also drawing its maximum current The present invention provides for selection of an optimal test load for use in normal operation and selection of an optimal bias resistance for use in loss of power mode that is based on the actual load present in the system 10. A test load is selected based on the maximum possible current drawn by the local load 24 and the maximum possible current drawn by a selected optional expansion load 28. In the situation where an optional expansion load is not selected, the test load 20 is chosen based on the current draw for a worse case condition of the local load 24 only. Additionally, the bias resistance component 18 is selected to provide a bias current based on the maximum current drawn by the local load 24 and the maximum current drawn by a selected optional expansion load 28. In the situation where an optional expansion load is not employed, the bias resistance component 18 is chosen based on the current draw for a worse case condition of the local load 24 only. As a result the life of the backup power source 12 is significantly increased. In addition, the time that the backup power source 12 can operate without the need for service (i.e., service life) is increased.

Figure 2:
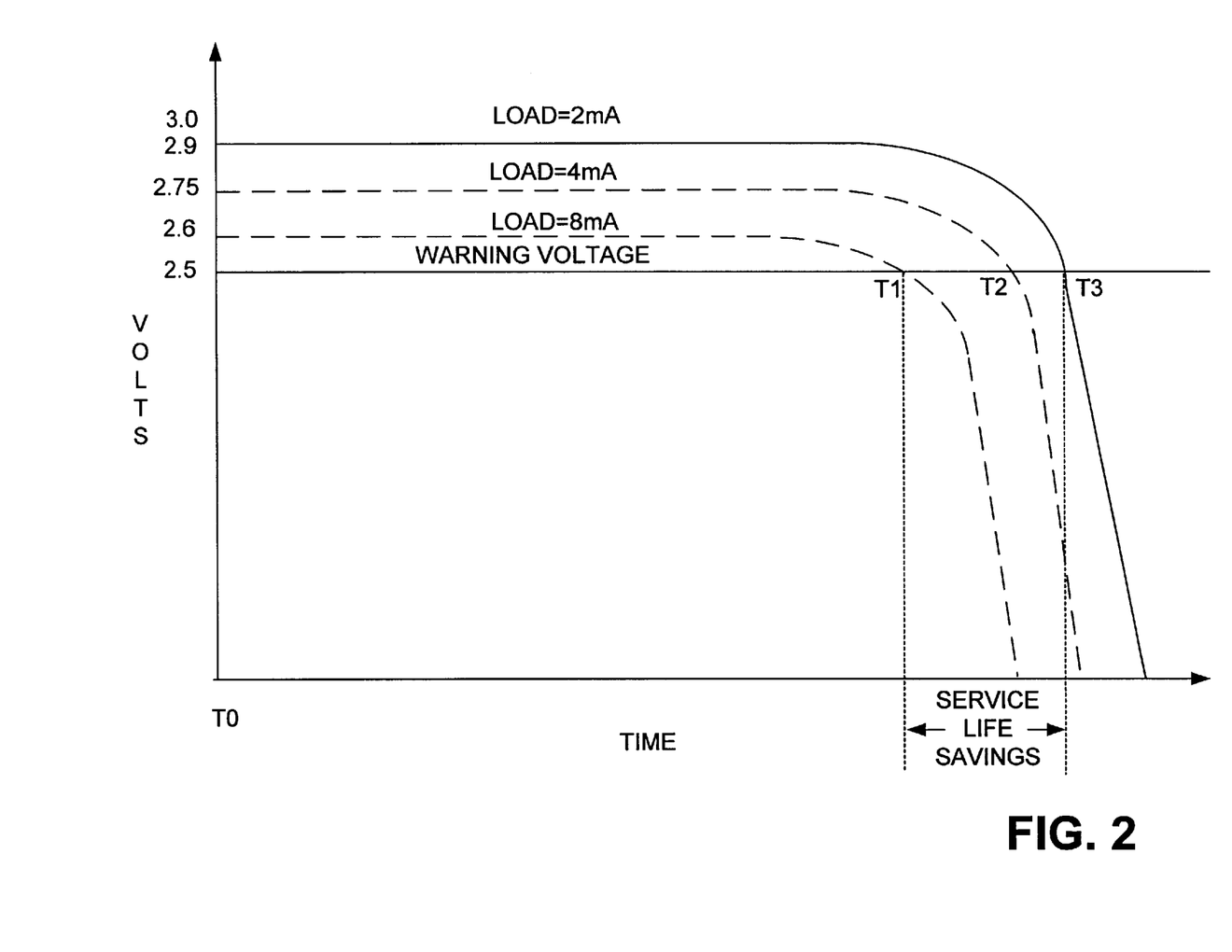
FIG. 2 is graph illustrating an example of voltage over time characteristics of a backup power source under different loading conditions in accordance with one aspect of the present invention.

FIG. 2 illustrates a graph of one particular example of voltage vs. time for a backup power source under different test loading conditions (e.g., 2 mA, 4 mA and 8 mA) while operating in the system of the present invention. The particular example illustrates a backup power source having a maximum non-loaded voltage of 3 volts and a backup power low warning voltage of 2.5 volts. In the present example, a test load of 2 mA causes the backup power source voltage to drop to 2.9 volts at time T0, a test load of 4 mA causes the backup power source voltage to drop to 2.75 volts at time T0 and a test load of 8 mA causes the voltage of the backup power source to drop to 2.6 volts at time T0. As the backup power source charge reduces over time, the 2 mA load will cause the voltage of the backup power source to fall below the service warning voltage at time T3. If the backup power source being discharged over time at 2 mA is tested at 4 mA, it will fall below the service warning voltage at time T2. If the backup power source being discharged Over time at 2 mA is tested at 8 mA, it will fall below the service warning voltage at time T1. The 2 mA curve also illustrates the voltage of the backup power source under 2 mA test load conditions as the battery charge is reduced over time, for example, during different battery backup modes. As is illustrated in the graph of FIG. 2, if a test load is sized for a 8 mA load where the actual load is closer to 2 mA (e.g. where a test load is sized for the maximum expansion load and the minimum expansion load is utilized), a service warning signal will be initiated at a time T1 much sooner than would be necessary for a time T3. Therefore, the present invention provides for selection of the test load for the actual operating load such that a service life savings is provided as illustrated in the graph of FIG. 2. In addition, the selection of the test load based on the actual load increases the backup power source life by ensuring the backup power source is not drained more than necessary during periodic application of the test load. Furthermore, a bias resistance is selected based on the actual load, so that excessive bias current is not wasted during backup power mode by selecting a bias resistance for a much higher load than the actual load.

Figure 3:
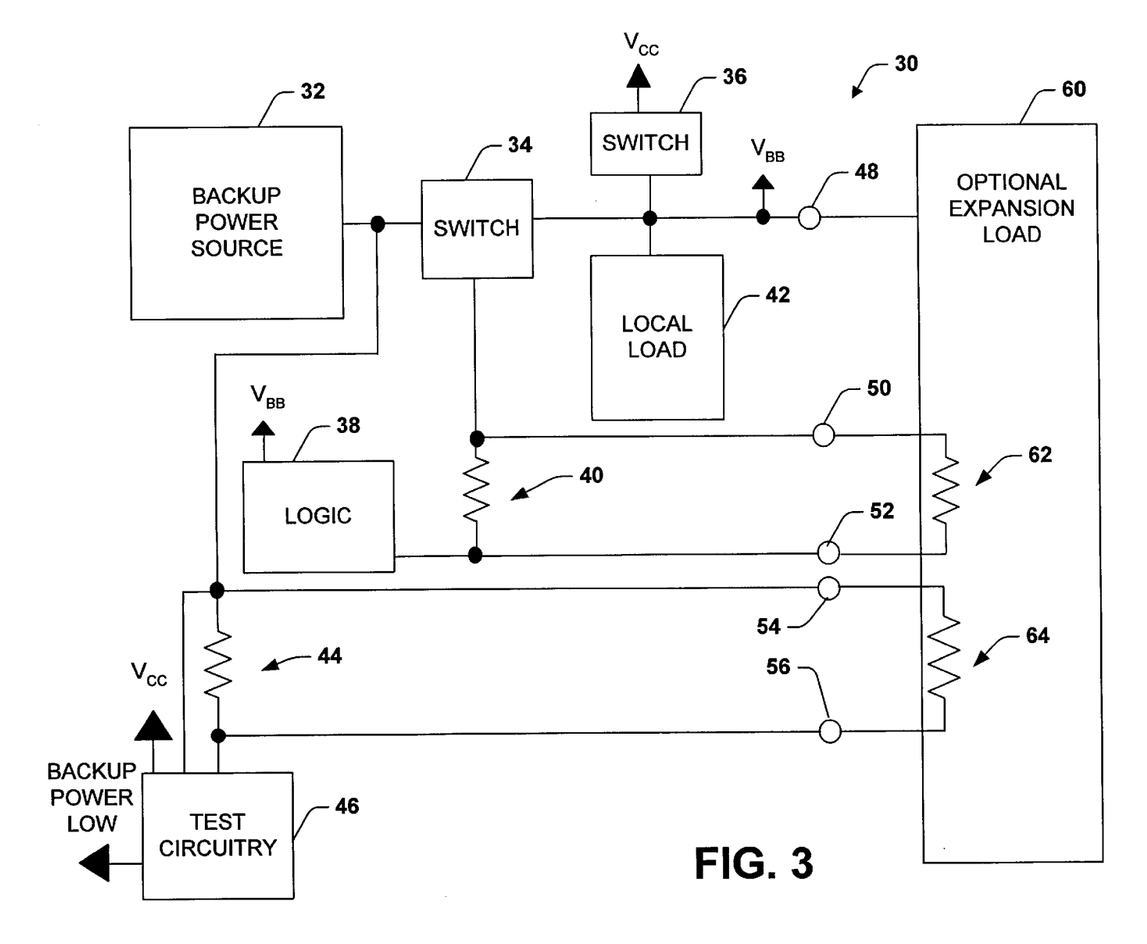
FIG. 3 is a block schematic diagram of an expandable system employing a backup power source utilizing hardware to provide a test load and a bias resistance corresponding to the actual load of the system in accordance with one aspect of the present invention.

FIG. 3 illustrates one particular example of selecting the test load and bias resistance based on the actual load present utilizing hardware. A system 30 is provided that includes a backup power source 32 for providing power to a local load 42 during a loss of power mode. The system 30 is expandable to provide an optional expansion load 60 with power during the loss of power mode via a power connector 48. The backup power source 32 is coupled to a first switch component 34 and a first test load resistor 44. The first test load resistor 44 is coupled to a test circuitry component 46, which monitors the backup power source voltage under test load and provides a backup power low signal to a controller (not shown) or the like when the backup power voltage falls below a predetermined level. The first test load resistor 44 is selected for providing a load current on the backup power source 32 based on a load current that the backup power source 32 would experience in a worse case condition of the local load 42.

The first switch component 34 is switchable between a first state when power is provided to the local load 42 and an optional expansion load 60 via normal or external power ($V_{cc}$) and a second state wherein $V_{cc}$ is not present and power is provided to the local load 42 and the optional expansion load 60 via the backup power source 32. The first switch 34 is coupled to a logic component 38 through a first bias resistor 40. The logic component 38 maintains the first switch component 34 in an open state and is powered by $V_{cc}$ during normal operating mode. The logic component 38 maintains the first switch component 34 in a closed state and is powered by the backup power source ($V_{BB}$) during loss of power mode. The first bias resistor 40 provides bias current to ensure that the switch 34 is closed during loss of power mode, so that the backup power source 32 can provide power to the local load 42. The first bias resistor 40 is selected for providing a bias current for a worse case condition of the local load 42. During normal operation, power is provided to the local load 42 and the optional expansion load 60 through a second switch 36. Normal power is also provided to the test circuitry component 46 and the logic component 38 during normal operation.

The optional expansion load 60 includes a second bias resistor 62 coupleable to the first bias resistor 40 via connectors 50 and 52. The second bias resistor 62 is selected, when placed in parallel with the first bias resistor 40, to provide a bias resistor value corresponding to the bias current necessary for a worse case condition of the local load 42 and the optional expansion load 60. The optional expansion load 60 also includes a second test load resistor 64 coupleable to the test load resistor 44 via connectors 54 and 56. The second test load resistor 64 is selected, when placed in parallel with the first test load resistor 44, to provide a test load value corresponding to the test load current necessary for a worse case condition of the local load 42 and the optional expansion load 60. Therefore, the bias resistance and test load are selectable to provide values based on the actual load present for both backup power source operation during power loss mode and backup power source testing during normal mode, respectively. Each expansion module can be provided with a bias resistor and a test load resistor according to the actual load of that particular expansion module. Furthermore, if no expansion module is present the first bias resistor 40 and the first test load resistor 44 are selected to provide bias current and test load current corresponding to the actual load of the local load 42.

Figure 4:
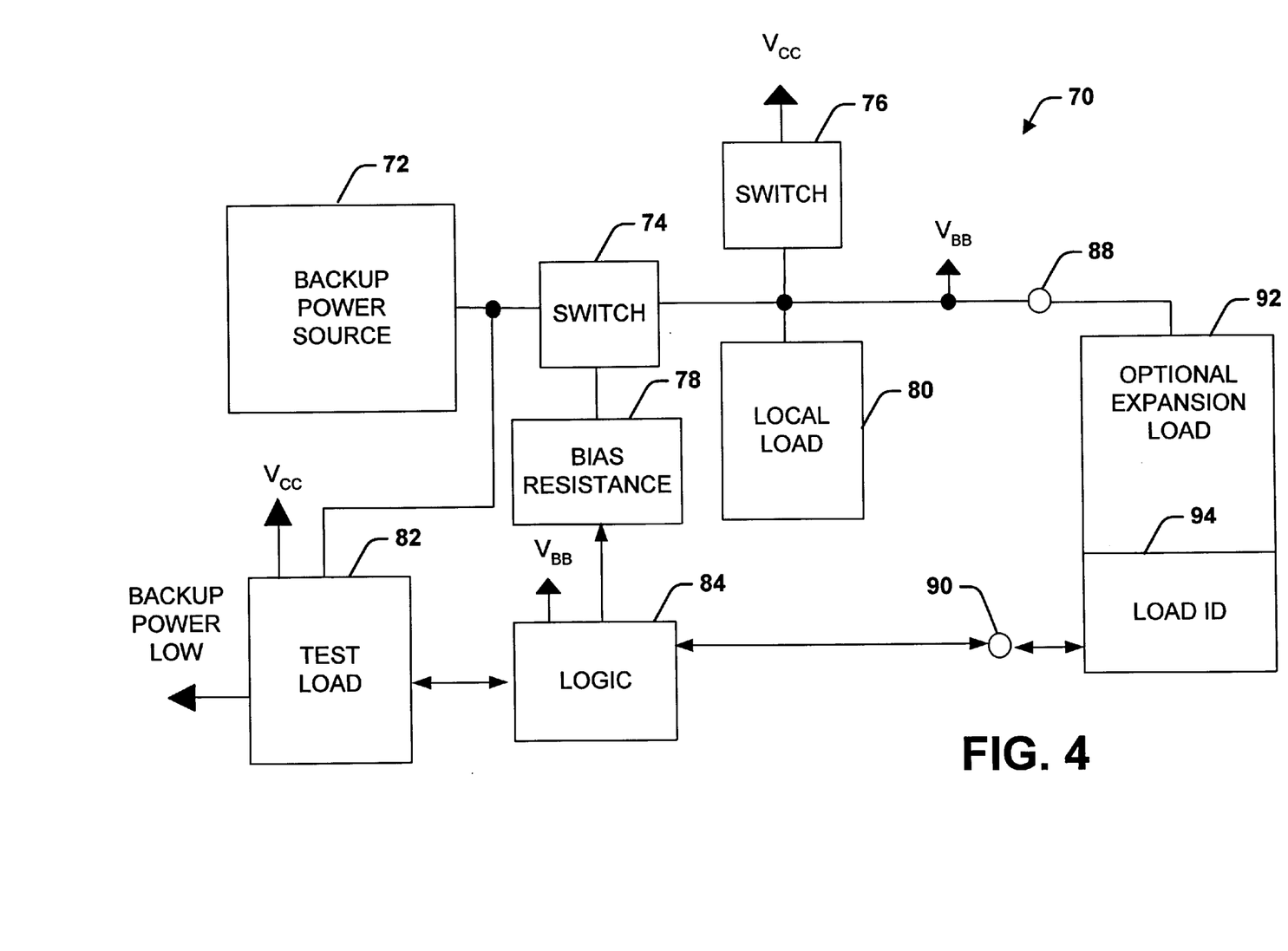
FIG. 4 is a block schematic diagram of an expandable system employing a backup power source utilizing software to provide a test load and a bias resistance corresponding to the actual load of the system in accordance with one aspect of the present invention.

It is to be appreciated that the present invention is not limited to selection of bias resistance and test loads utilizing hardware. FIG. 4 illustrates employment of the present invention utilizing software. A system 70 is provided that includes a backup power source 72 for operating a local load 80 during a loss of power mode. The system 70 is expandable to provide an optional expansion load 92 with power during the loss of power mode via a power connector 88. The backup power source 72 is coupled to a first switch component 74 and a test load component 82. The test load component 82 is coupled to a logic component 84. The logic component 84 is operable to provide a request for a load identification (ID) 94 from the optional expansion board over a communication connector 90. The logic component 84 then utilizes the load ID to select an appropriate test load at the test load component 82 based on the actual load that the backup power source 72 would experience in a worse case condition of the local load 80 and the optional expansion load 92. If the logic component 84 senses that an optional expansion load is not present, the logic component 84 selects a test load appropriate for testing the worse case condition of the local load 80 only. The test load is selected based on the actual load present in the system 70. The test load component 82 then periodically monitors the backup power source voltage under test load and provides a backup power low signal to a controller (not shown) or the like when the backup power voltage falls below a predetermined level.

The first switch component 74 is switchable between a first state when power is provided to the local load 80 and optional expansion load 92 via normal or external power ($V_{cc}$) and a second state wherein $V_{cc}$ is not present and power is provided to the local load 80 and optional expansion load 92 via the backup power source 72. The first switch component 74 is coupled to the logic component 84 through a bias resistance component 78. During normal operation, power is provided to the local load 80 and the optional expansion load 92 through a second switch 76. Normal power is also provided to the test load component 82 and the logic component 84 during normal operation. During loss of power mode, the logic component 84 is powered by backup power ($V_{BB}$). The logic component 84 maintains the first switch component 74 in an open state during normal operating mode and maintains the first switch component 74 in a closed state during power loss mode. The bias resistance component 78 provides bias current to ensure that the switch 74 is closed during loss of power mode, so that the backup power source 72 can provide power to the local load 80 and the optional expansion load 92. The logic component 84 requests the load ID 94 from the optional expansion board 92. The logic component 84 then sets the resistance in the bias resistance component 78 to provide a bias resistance necessary to drive current through the first switch component 74 corresponding to a worse case condition of the local load 80 and the optional expansion load 92. If the logic component 84 senses that an optional expansion load is not present, the logic component 84 selects the bias resistance necessary to drive current for providing backup power in a worse case condition of the local load 80.

Selection of the appropriate load ID and load setting can be accomplished by determining a worse case current draw for the local load and any expansion loads in a manufacturing environment. For example, the worse case condition may be at high temperatures for one particular load and low temperatures for another particular load. Once the worse case condition is determined, the load settings may be set in memory (eg., firmware) on the test load component 82, the logic component 84 and/or the optional expansion load.

Alternatively, the actual load may be determined periodically (e.g., in real time) during operation of the system and the test load and bias resistance set accordingly.

It is to be appreciated that the logic for selecting the appropriate test load and bias resistance may be provided in the test load component 82 and the bias resistance component 78, respectively. In this situation, the logic component 84 may be operable to send and receive a load ID and pass the load ID to the appropriate component. Additionally, the test load component and bias resistance component may be operable to send and receive load ID requests directly.

Figure 5:
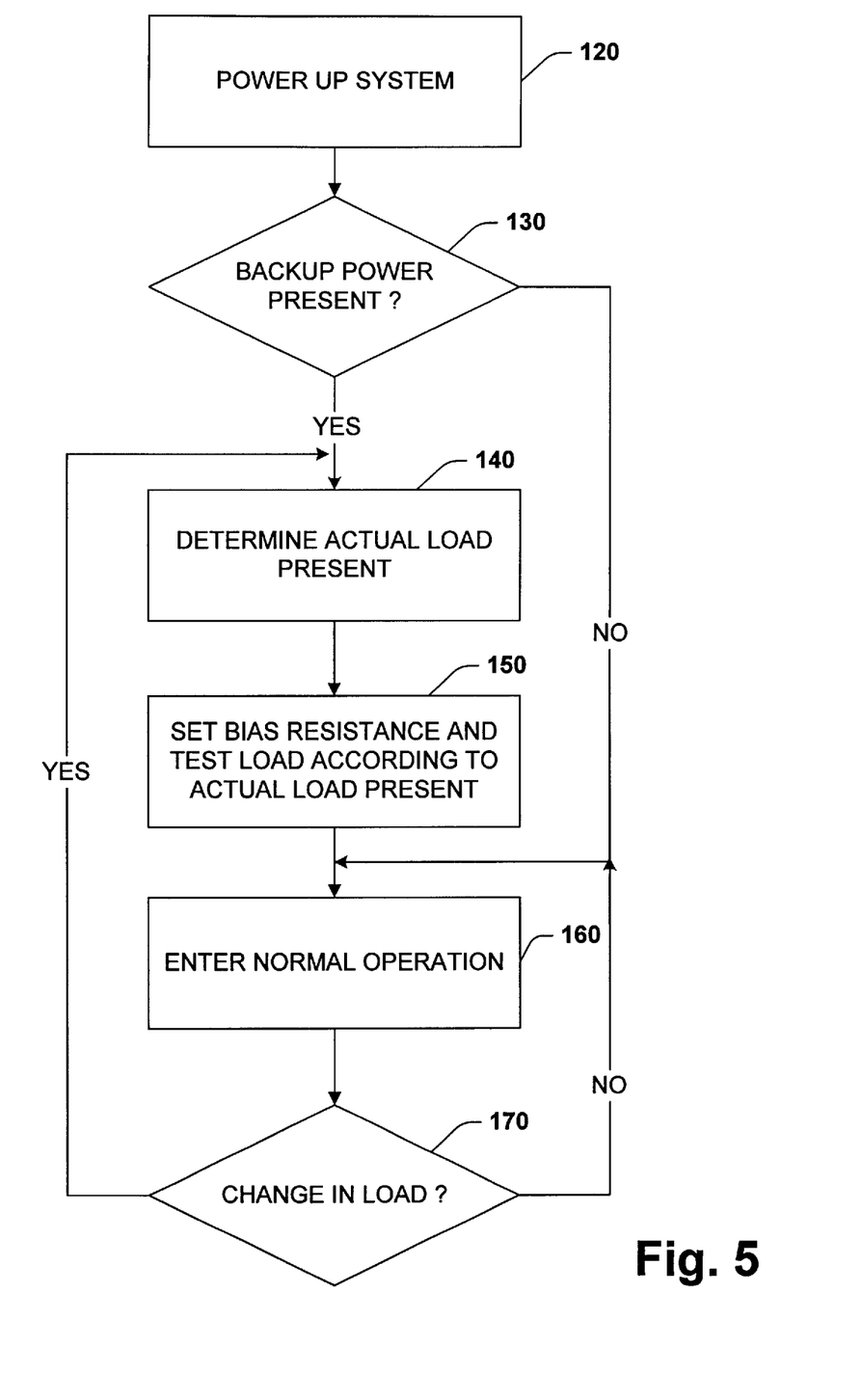
FIG. 5 is flow diagram illustrating one particular methodology in accordance with one aspect of the present invention.

FIG. 5 is a flow diagram illustrating a methodology for selecting an appropriate bias resistance and an appropriate test load for a system employing a backup power source. At step 120, the system is powered up by providing the components of the system with normal power (eg., $V_{cc}$). At step 130, the system determines whether or not a backup power source is present. If a backup power source is not present (NO), the system advances to step 160 to enter normal operation. If a backup power source is present (YES), the system proceeds to step 140. At step 140, the system determines the actual load present including the local load and any expansion load coupled to the local load. At step 150, the system sets the bias resistance and the test load based on the actual load present. At step 160, the system enters normal operation where the local and any expansion load are powered by normal power and periodic testing of the backup source is employed utilizing the selected test load. The system proceeds to step 170 to determine if any changes in the load has occurred. If any change in the load has not occurred (NO), the system returns to normal operation at step 160. If any change in the load has occurred (YES), the system returns to step 140 to determine the actual load present.

Figure 6:
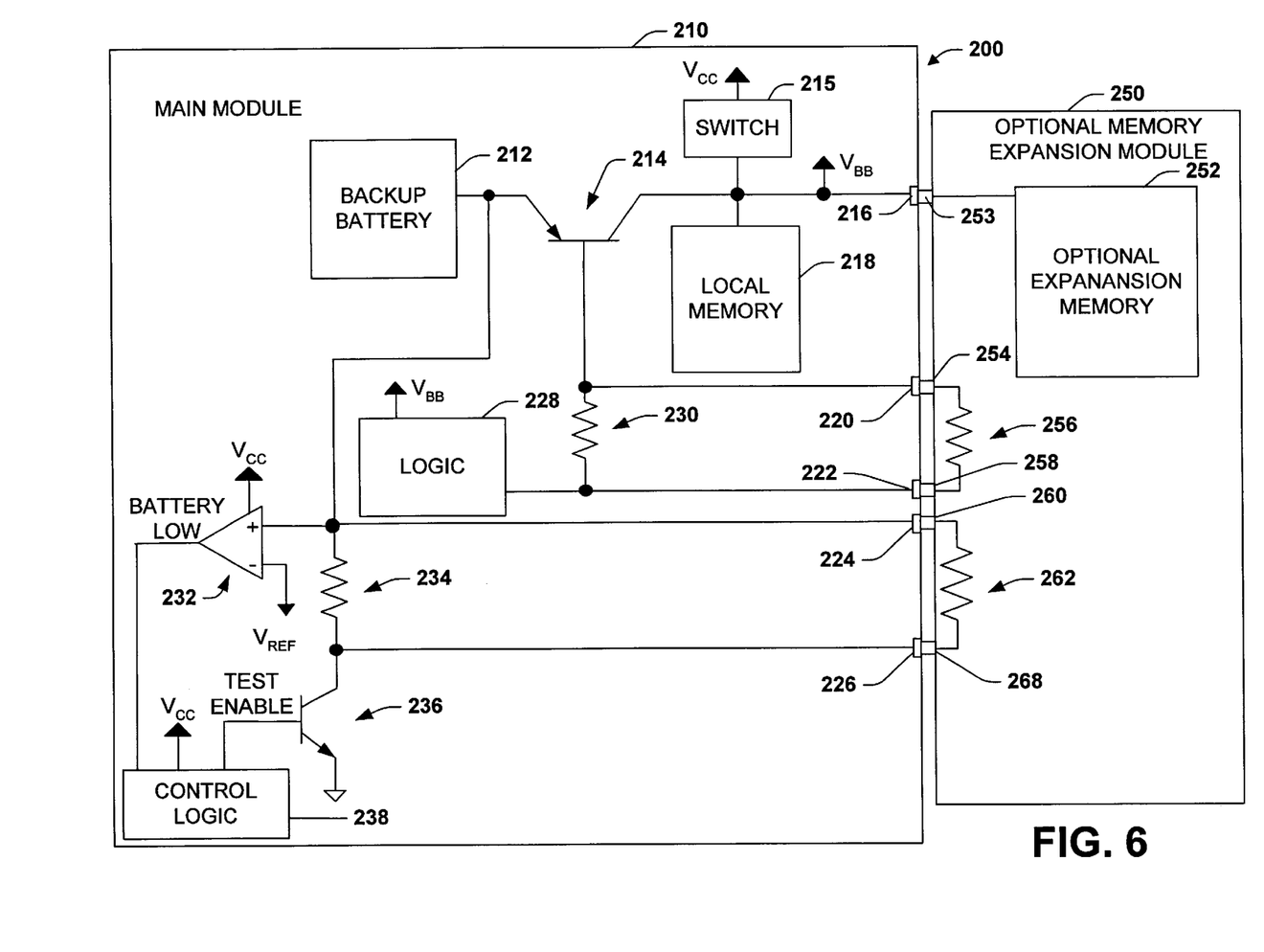
FIG. 6 is a block schematic diagram of a system employing a backup battery and having expandable memory utilizing hardware to provide a test load and a bias resistance corresponding to the actual load of the memory of the system in accordance with one aspect of the present invention.

FIG. 6 illustrates an example of employing the present invention in a system utilizing volatile memory (e.g., DRAM, SRAM, SDRAM) that provides for the ability to expand the volatile memory with memory expansion boards. A system 200 is provided having a main or mother module 210 coupled to an optional memory expansion or daughter module 250. The main module 210 includes a backup battery 212 for providing power to a local volatile memory 218 during a loss of power mode. The system 200 is expandable to provide an optional expansion memory 252 with power during the loss of power mode via a power connector 216 on the main module 210 coupleable to a power connector 253 on the optional memory expansion module 250. The backup battery 212 is typically a non-rechargeable battery with a substantially long life (e.g., 2 weeks, 1 month, 6 months, 12 months). However, a rechargeable battery may be employed. The backup battery 212 is coupled to a PNP transistor 214 and a first test load resistor 234. The first test load resistor 234 is coupled to comparator 232 on a first end and an NPN transistor 236 on a second end. Alternatively, an NFET or other switching mechanism can be used in place of the NPN transistor 236. The comparator 232 monitors the backup battery voltage during a test mode and provides a battery low signal to a control logic component 238 when the battery backup voltage falls below a predetermined level.

The first test load resistor 234 is selected for providing a load current on the backup battery 212 based on a load current that the backup battery 212 would experience in a worse case condition of the local memory 218. The control logic component 238 periodically provides a test enable signal to the NPN transistor 236 causing the current to be drawn from the backup battery 212 through the test load.

The comparator 232 has a first state where the voltage into its positive terminal ($V_{BAT}$ under test load) is higher than the voltage into the negative terminal ($V_{REF}$). The comparator 232 has a second state where the voltage into its positive terminal ($V_{BAT}$ under test load) is less than the voltage into the negative terminal ($V_{REF}$). The control logic component 238 reads the comparator output signal and determines whether or not to initiate a battery low signal to an operator.

During normal operation, power is provided to the local memory 218 and the optional expansion memory 252 through a second switch 215. The PNP transistor 214 is switchable between a first state when power is provided to the local memory 218 and the optional expansion memory 252 via normal or external power ($V_{cc}$) and a second state wherein $V_{cc}$ is not present and power is provided to the local memory 218 and the optional expansion memory 252 via the backup battery 212. The PNP transistor 214 is coupled to a logic component 228 through a first bias resistor 230. The logic component 228 is powered by $V_{cc}$ and maintains the PNP transistor 214 in an off state during normal operating mode. The logic component 228 is powered by battery voltage ($V_{BB}$) and maintains the PNP transistor 214 in an on state during loss of power mode. The first bias resistor 230 provides bias current to ensure that the PNP transistor 214 is on during loss of power mode, so that the backup battery 212 can provide power to the local memory 218. The first bias resistor 230 is selected for providing a bias resistance to provide an operating current for a worse case condition of the local memory 218. During normal operation, power is provided to the local memory 218 and the optional expansion memory through a second switch (not shown). Normal power is also provided to the comparator 232, the control logic component 238 and the logic component 228 during normal operation.

The optional expansion memory module 250 includes a second bias resistor 256 coupled to connectors 254 and 258 on the optional expansion memory module 250. The first bias resistor 230 is coupled to connectors 220 and 222 on the main module 210. The connectors 254 and connectors 258 are coupleable to the connectors 220 and 222, respectively, such that the second bias resistor 256 can be placed in parallel with the first bias resistor 230 to provide an adjusted bias resistance for the system 200. The second bias resistor 256 is selected, when placed in parallel with the first bias resistor 230, to provide a bias resistor value corresponding to the bias resistance necessary for providing an operating current for a worse case condition of the local memory 218 and the optional expansion memory 252.

The optional expansion memory module 250 also includes a second test load resistor 262 coupled to connectors 260 and 268 on the optional memory module 250. The first test load resistor 234 is coupled to connectors 224 and 226 on the main module 210. The connectors 260 and connectors 268 are coupleable to the connectors 224 and 226, respectively such that the second test load resistor 262 can be placed in parallel with the first test load resistor 234 to provide an adjusted test load resistance for the system 200. The second test load resistor 262 is selected, when placed in parallel with the first test load resistor 234, to provide a test load value based on the load current necessary for a worse case condition of the local memory 218 and the optional expansion memory 252. Therefore, the bias resistance and the test load are selectable to provide values for the actual load present for both battery backup operation during power loss mode and battery backup testing during normal mode, respectively. Each optional memory expansion device can be provided with a bias resistor and a test load resistor according to the actual load of that particular expansion memory. Furthermore, if no expansion memory is present the first bias resistor 230 and the first test load resistor 234 are selected to provide bias current and test load current corresponding to the actual load of the local memory 218.

It is to be appreciated that the present invention has particular application to industrial control systems employing volatile memory where the volatile memory is retained during a shutdown period by backup batteries. Typically, these systems utilize long life non-rechargeable batteries. System shutdown may occur periodically or systematically and it is essential to provide battery low warnings to the customer to facilitate retaining of programs and data stored in volatile memory. Although the present example is illustrated with respect to second bias resistor and second test load resistor residing on the memory expansion module, a plurality of second bias and test load resistors may reside on the main module and be selected based on jumpers provided on the memory expansion modules. Other mechanisms for matching bias and test resistors for an actual load provided by local and optional memory expansion modules may also be provided according to the present invention.

What has been described above are preferred embodiments of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. An expandable load system employing a backup power source, the system comprising:
    a test load component coupled to the backup power source, the test load component being operable to provide a test load based on an actual load of the system in a worse case condition for periodic testing of the backup power source during normal operation;
    a switch component coupled to the backup power source, the switch component having a first state coupling the backup power source to the local load during a power loss mode and a second state decoupling the backup power source to the local load during normal operation; and
    a bias resistance component coupled to the switch component, the bias resistance component being operable to provide a bias resistance necessary to provide a current through the switch component from the backup power source based on the actual load of the system in a worse case condition in the power loss mode.

2. The system of claim 1, the actual load comprising a local load and an optional expansion load coupled to the local load.

3. The system of claim 1, the test load component comprising a first test load resistor sized to provide adequate determination of the backup power source to provide current to the actual load in a worse case condition.

4. The system of claim 3, the test load component further comprising a second test load resistor residing on an optional expansion load, the second test load resistor being coupleable to be in parallel with the first test load to provide a test load sized to provide adequate determination of the backup power source to provide current to the local load and the optional expansion load in a worse case condition.

5. The system of claim 1, the bias resistance component comprising a first bias resistor sized to provide a bias resistance adequate for providing a current through the switch component from the backup power source to a local load for a worse case condition.

6. The system of claim 5, the bias resistance component further comprising a second bias resistor residing on an optional expansion load, the second bias resistor being coupleable to be in parallel with the first bias resistor to provide a bias resistance adequate for providing a current through the switch component from the backup power source for the local load and an optional expansion load in a worse case condition.

7. The system of claim 1, the switch component being a PNP transistor.

8. The system of claim 1, the test load component being further operable to provide a low power signal if the voltage of the backup power source falls below a predetermined level during test loading.

9. The system of claim 1, the backup power source being a rechargeable battery.

10. The system of claim 1, further comprising an optional expansion load coupled to the local load wherein the test load component is selectable to provide a test load adequate for determining the ability of the backup power source to provide current to the local load and the expansion load in a worse case condition.

11. The system of claim 10, further comprising a logic component operable to request and receive an optional expansion load ID and set the test load component based on the local load and the optional expansion load ID.

12. The system of claim 1, further comprising an optional expansion load coupled to a local load wherein the bias resistance component is selectable to provide a bias resistance adequate to provide the current necessary through the switch component from the backup power source to the local load and the expansion load in a worse case condition.

13. The system of claim 12, further comprising a logic component operable to request and receive an optional expansion load ID and set the bias resistance component based on the local load and the optional expansion load ID.

14. A method for selecting a test load for an expandable load system employing a backup power source and for selecting a bias resistance for driving a switch coupling the backup power source to an actual load, the method comprising the steps of:
   determining an actual load present;
   setting a test load based on the actual load present; and
   setting a bias resistance according to the actual load present.

15. The method of claim 14, the actual load present comprising a local load and an expansion load.

16. The method of claim 14, the local load comprising a local memory and the expansion load comprising an expansion memory.

17. The method of claim 14, further comprising a step of reading an optional load ID prior to the step of determining the actual load present.

18. The method of claim 14, further comprising the step of determining if a change in load has occurred and repeating the step determining of the actual load present if a change in load has occurred.

19. A system having a local memory and a backup battery wherein the system is adapted to receive optional expansion memory, the system comprising:
   a main module comprising a test load resistor coupled to a backup battery, the test load resistor being operable to provide a test load adequate for determining the ability of the backup battery to provide current to the actual load in a worse case condition for periodic testing of the backup battery during normal operation.

20. The system of claim 19, further comprising a second test load resistor residing on an optional expansion memory module coupleable to the main module, the second test load resistor being coupleable to be in parallel with the first test load resistor to provide a test load adequate for determining the ability of the backup battery to provide current to the local memory and an optional expansion memory in a worse case condition.

21. The system of claim 19, further comprising a PNP transistor switch coupled to the backup battery, the PNP transistor switch having an on state coupling the backup battery to the local memory during a power loss mode and an off state decoupling the backup battery to the local memory during normal operation.

22. The system of claim 21, further comprising a bias resistor coupled to the PNP transistor switch, the bias resistor being sized to provide a bias resistance adequate for providing a current through the PNP transistor switch from the backup power source for the actual load for the local memory of the system in a worse case condition in the power loss mode.

23. The system of claim 22, further comprising a second bias resistor residing on an optional expansion memory module coupleable to the main module, the second bias resistor being coupleable to be in parallel with the first bias resistor to provide a bias resistance adequate for providing a current through the PNP transistor switch from the backup battery for the local memory and an optional expansion memory in a worse case condition.

24. The system of claim 19, the backup battery being a non-rechargeable battery.

25. The system of claim 19, the main module being an industrial control module.

26. A system for selecting a test load for an expandable load system employing a backup power source and for selecting a bias resistance for driving a switch coupling the backup power source to an actual load, the system comprising:
   means for determining an actual load present;
   means for setting a test load based on the actual load present; and
   means for setting a bias resistance according to an actual load present.

27. The system of claim 26, the actual load present comprising a local load and an expansion load.

28. The system of claim 26, the local load comprising a local memory and the expansion load comprising an expansion memory.

* * * * *